UNITED STATES PATENT OFFICE.

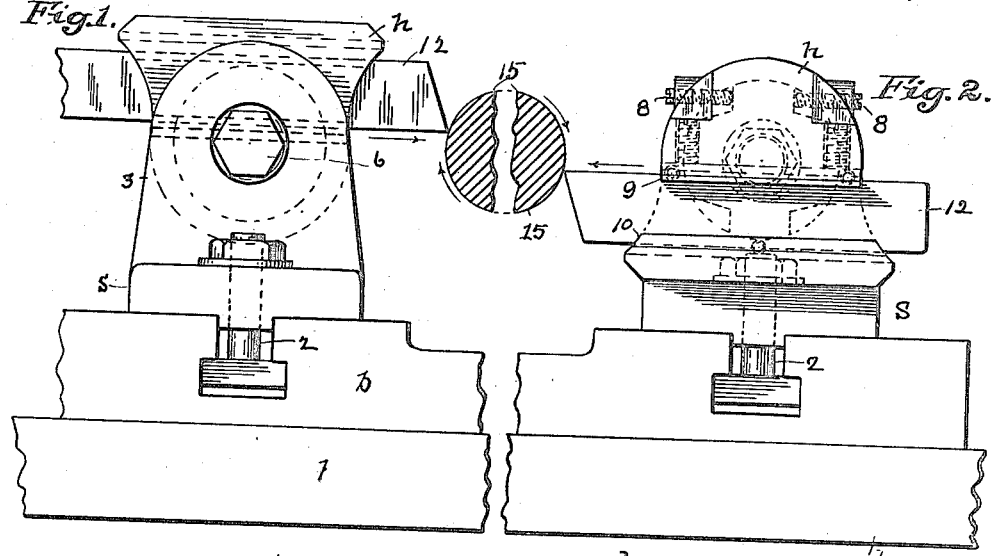
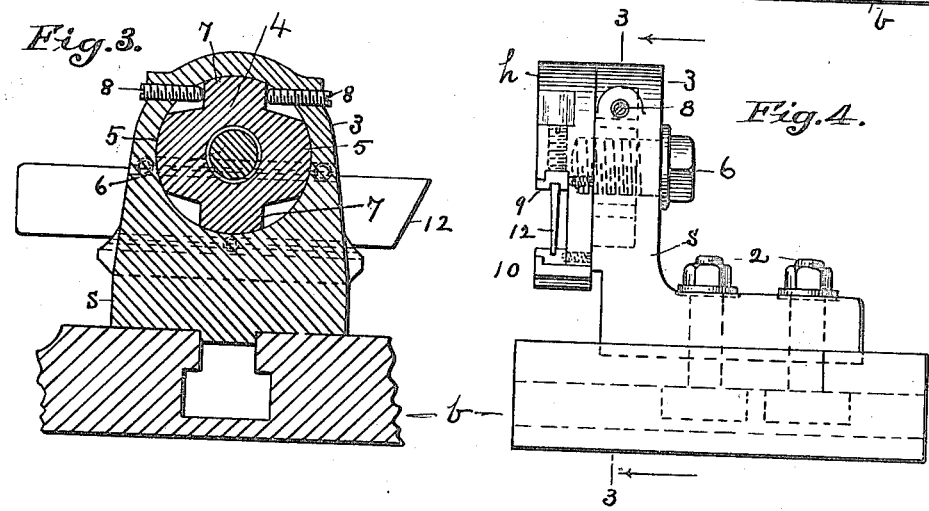
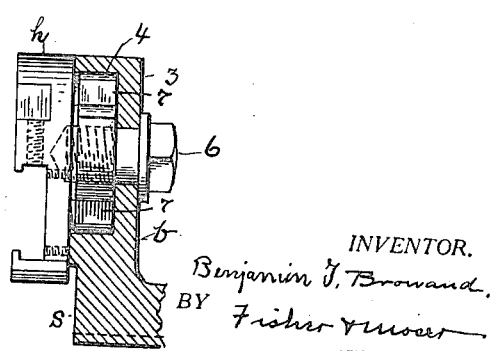

BENJAMIN T. BROWAND, OF CLEVELAND, OHIO.

TOOL-HOLDER FOR AUTOMATIC MACHINES.

1,222,178.　　　　　　Specification of Letters Patent.　　Patented Apr. 10, 1917.

Application filed July 14, 1916. Serial No. 109,252.

*To all whom it may concern:*

Be it known that I, BENJAMIN T. BROWAND, a citizen of the United States, residing at Cleveland, in the county of Cuyahoga and State of Ohio, have invented certain new and useful Improvements in Tool-Holders for Automatic Machines, of which the following is a specification.

This invention pertains to a tool holder for automatic machines, and the invention consists in the construction of a holder adapted to reverse the tool as shown and described and particularly pointed out in the claims.

In the accompanying drawings, Figure 1 is a rear elevation of the holder with a tool therein, and Fig. 2 is a front elevation thereof. Fig. 3 is a vertical sectional elevation on line 3—3, Fig. 4, and Fig. 4 is a side elevation of the holder with a tool therein. Fig. 5 is a sectional elevation of the holder front to rear substantially at its center.

The idea herein is to provide a holder for automatic machines which is capable of such adjustment as to the position of the tool as will afford speedy and accurate reversal thereof both as to the tool itself and to the holder, say as seen in the two opposite positions in Figs. 1 and 2, in which both the tool and the holder are reversed and means are shown to fix the holder positively in either position. Thus, the standard or support $s$ is a right angled part slidably and detachably engaged in the base $b$ by means of stud screws 2 and having a head 3 in which the holder proper, indicated by $h$, is rotatably secured. The said holder has a shank or boss 4 on its rear adapted to fit in an annular seat in the front of the supporting head $h$ and a clamping screw 6 confines the holder in the head and on which the holder is adapted to be rotated for reversal, as described. The said shank or boss 4 has two opposed and equal segmental bearings 5 on which it is engaged in said seat or recess and two opposite square shouldered ribs 7 midway between said bearings which are adapted to be engaged by two opposite set screws 8 through the wall of head 3 according as one or the other of said ribs is rotated to position to be thus engaged. The said screws are adapted to be adjusted to give any required position to said holder relative to its support and to firmly lock the holder when set by said screws, which coöperate with the binding screw 6 in securing the holder firmly in place when adjusted.

The support $s$ is slidably and adjustably seated on the base $b$ and adapted to be locked by the said nuts 2 in any desired position, and the holder $h$ has seats for gibs or jaws 9 and 10 therein and adapted to engage and lock upon the edges of the tool 12 and hold it in working position, the upper of said gibs being shown as adjustable to make room for removal and the like and for effective clamping engagement on the tool.

The rotatability and reversibility or inversion of the holder is plainly seen in Figs. 1 and 2, where in one position the tool is brought above the center of rotation on shank 4 and in the other beneath said center, and the tool is thereby reversed in its cutting position or relation to the stock 15.

What I claim is:

1. A tool holder for automatic machines having opposite bearings to engage a tool therein and a support in which said holder is adapted to be rotarily inverted, the said bearings being off the center of rotation, whereby the tool can be inverted on opposite sides of the stock to be cut.

2. A tool holding mechanism as described, comprising a substantially right angled support having an annular seat in its vertical portion and a holder having a hub at its side rotatably clamped in said seat and provided with opposite side bearings and shouldered projections between said bearings, and set screws through the top of said support adapted to engage one of said projections on opposite sides and rigidly engage the holder in said support.

3. In tool holders for automatic machines, a support having an upright portion having an annular seat, a tool holder having a hub at one side of the center thereof and provided with opposite bearings and opposite rib like projections between said bearings, and set screws oppositely through the wall of said support adapted to engage both sides of one or the other of said projections and lock said holder against rotation, and means through said support engaged centrally in said hub to secure the hub in place.

In testimony whereof I affix my signature in presence of a witness.

BENJAMIN T. BROWAND.

Witness:
R. B. MOSER.

Copies of this patent may be obtained for five cents each, by addressing the "Commissioner of Patents, Washington, D. C."